(12) United States Patent
Bogen et al.

(10) Patent No.: US 11,239,581 B2
(45) Date of Patent: Feb. 1, 2022

(54) ELECTRICAL CONNECTOR AND A CONTROL VALVE INCLUDING THE SAME

(71) Applicant: BorgWarner Inc., Auburn Hills, MI (US)

(72) Inventors: Martin P. Bogen, Rochester Hills, MI (US); Johannes A. Preiss, Lake Orion, MI (US)

(73) Assignee: BorgWarner Inc., Auburn Hills, MI (US)

( * ) Notice: Subject to any disclaimer, the term of this patent is extended or adjusted under 35 U.S.C. 154(b) by 102 days.

(21) Appl. No.: 16/866,748

(22) Filed: May 5, 2020

(65) Prior Publication Data

US 2020/0358210 A1    Nov. 12, 2020

Related U.S. Application Data

(60) Provisional application No. 62/845,616, filed on May 9, 2019.

(51) Int. Cl.
*H01R 11/05* (2006.01)
*H01R 13/11* (2006.01)

(52) U.S. Cl.
CPC ........... *H01R 11/05* (2013.01); *H01R 13/112* (2013.01); *H01R 2201/26* (2013.01)

(58) Field of Classification Search
CPC ............................ H01R 2201/26; H01R 11/05
See application file for complete search history.

(56) References Cited

U.S. PATENT DOCUMENTS 7,753,715 B2    7/2010    Freakes
8,454,396 B2    6/2013    Horn

*Primary Examiner* — Briggitte R. Hammond
(74) *Attorney, Agent, or Firm* — Howard & Howard Attorneys PLLC

(57) ABSTRACT

An electrical connector includes a blade terminal configured to establish an electrical circuit. The electrical connector also includes a receiving terminal coupled to the blade terminal. The receiving terminal includes a bridge portion, a first leg extending from the bridge portion, and a second leg extending from the bridge portion and separated from the first leg by a slot defined by the bridge portion, the first leg, and the second leg. Moreover, at least one of the first leg and the second leg include a geometric feature extending into the slot such that the slot is configured to prevent insertion of a second electrical connector into the slot.

16 Claims, 2 Drawing Sheets

ELECTRICAL CONNECTOR AND A CONTROL VALVE INCLUDING THE SAME

CROSS-REFERENCE TO RELATED APPLICATIONS

This application claims priority to and all the advantages of U.S. Provisional Patent Application No. 62/845,616, filed May 9, 2019, the entire contents of which are hereby incorporated by reference.

BACKGROUND OF THE INVENTION

1. Field of the Invention

The subject invention relates generally to a control valve and, more specifically, an electrical connector for use in the control valve.

2. Description of the Related Art

Conventional vehicle powertrain systems known in the art typically include an engine in rotational communication with a transmission. The engine generates rotational torque which is selectively translated to the transmission which, in turn, translates rotational torque to one or more wheels. Typical transmissions are shifted in discrete steps between a high-torque, low-speed mode for starting a vehicle and a high-speed, low-torque mode for vehicle operation at highway speeds. In a manual transmission, shifting is accomplished by the manual controlled engagement of gear sets. In an automatic transmission, shifting is accomplished by the automatic controlled engagement of friction elements.

To facilitate shifting and controlled engagement of the friction elements of the automatic transmission, the vehicle powertrain system typically includes a pump to provide pressurized hydraulic fluid, and a plurality of control valves for controlling a flow of fluid through a hydraulic circuit. In other applications, control valves are used to regulate a flow of exhaust gas produced from the engine. The control valve may be an exhaust gas control valve which may be used in various application and can be employed as an exhaust gas recirculation (EGR) valve, a bypass valve, an exhaust tuning valve, and the like.

Conventional control valves used to control the flow of fluid through the hydraulic circuit include electrical connectors to establish an electrical circuit for operation. However, typical electrical connectors include an elongated slot along a portion of a length of the electrical connector. During shipping, two or more electrical connectors often become entangled as one electrical connector may become unintentionally inserted sideways into the slot of another electrical connector. As a result of this entanglement, one or more of the electrical connectors may become deformed and rendered unusable. As such, there remains a need for an electrical connector which prevents entanglement and therefore deformities during shipping while still able to establish the desired electrical circuit for the control valve.

SUMMARY OF THE INVENTION AND ADVANTAGES

An electrical connector is disclosed herein. The electrical connector includes a blade terminal configured to establish an electrical circuit and a receiving terminal defining a slot configured to prevent insertion of a second electrical connector into the slot. In one embodiment, the receiving terminal includes a bridge portion, a first leg extending from the bridge portion, and a second leg extending from the bridge portion and separated from the first leg by a slot defined by the bridge portion, the first leg, and the second leg. Moreover, at least one of the first leg and the second leg include a geometric feature extending into the slot such that the slot is configured to prevent insertion of a second electrical connector into the slot. Additionally, a control valve for controlling a flow of fluid medium including the electrical connector is disclosed herein.

Having the slot of the electrical connector configured to prevent insertion of a second electrical connector into the slot prevents entanglement and therefore deformation of the electrical connectors during shipping while still able to establish an electrical circuit during operation of a control valve.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE INVENTION

Figure 1A:
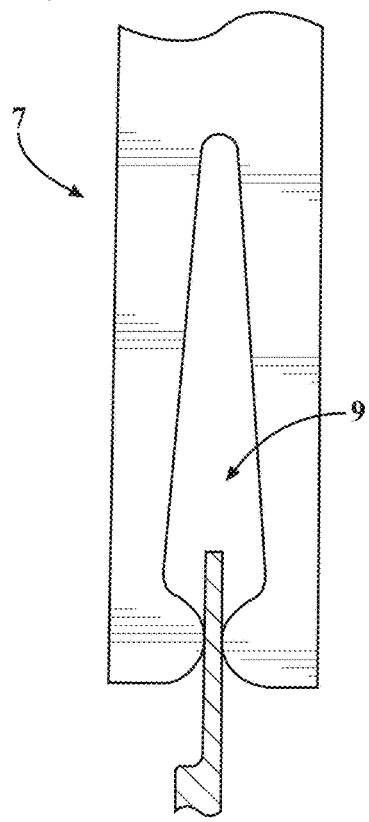
FIG. 1A is a front view of a prior art electrical connector in a control valve.
Figure 1B:
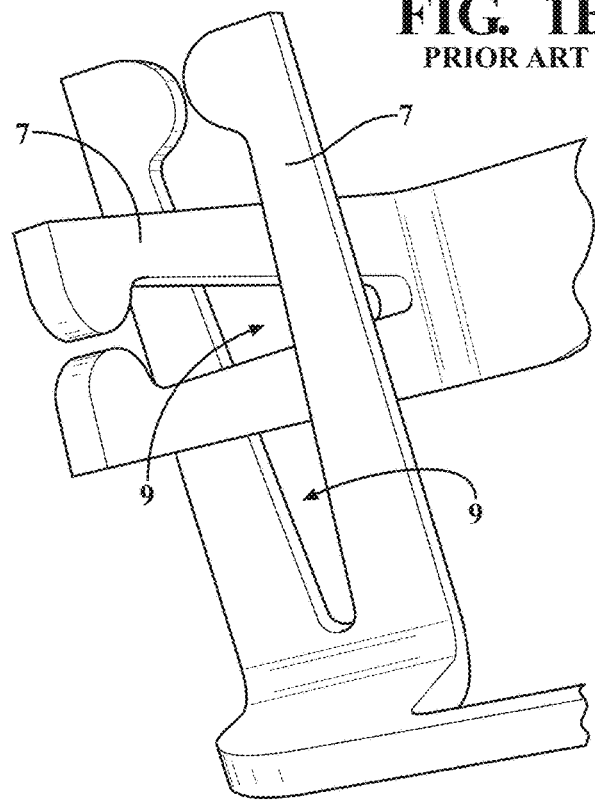
FIG. 1B is a rear perspective view of two prior art electrical connectors of FIG. 1A.

Referring now to the Figures, where like numerals are used to designate like structure unless otherwise indicated, a portion of a prior art control valve for controlling a flow of a fluid medium is generally shown in FIG. 1A. The prior art control valve includes a prior art electrical connector 7. As illustrated in FIG. 1A, the prior art electrical connector 7 includes an elongated slot 9 along a portion of a length of the prior art electrical connector 7. During shipping, two or more prior art electrical connectors 7 become tangled as one prior art electrical connector 7 may become unintentionally inserted sideways into or get "caught" in the slot 9 of another prior art electrical connector 7, as shown in FIG. 1B. As a result of this entanglement, one or more of the prior art electrical connectors 7 may become deformed and rendered unusable when pulled apart for use.

An electrical connector 10 designed to prevent entanglement is illustrated in FIGS. 2-5. The electrical connector 10 includes a blade terminal 12 configured to establish an electrical circuit. The electrical circuit may be used to power one or more elements of the control valve 40 or may be used to power other components of a vehicle powertrain system that are not the control valve 40. The electrical connector 10 may be comprised of steel, aluminum, an alloy, or the like.

The electrical connector 10 also includes a receiving terminal 16 coupled to the blade terminal 12. More specifically, the receiving terminal 16 of the electrical connector 10 is configured to engage an electrical terminations 14. The receiving terminal 16 includes a bridge portion 18, a first leg 20, and a second leg 22. The first leg 20 and the second leg 22 each extend from the bridge portion 18. Moreover, the second leg 22 is separated from the first leg 20 by a slot 24. The slot 24 is defined by the bridge portion 18, the first leg 20, and the second leg 22.

Figure 5:
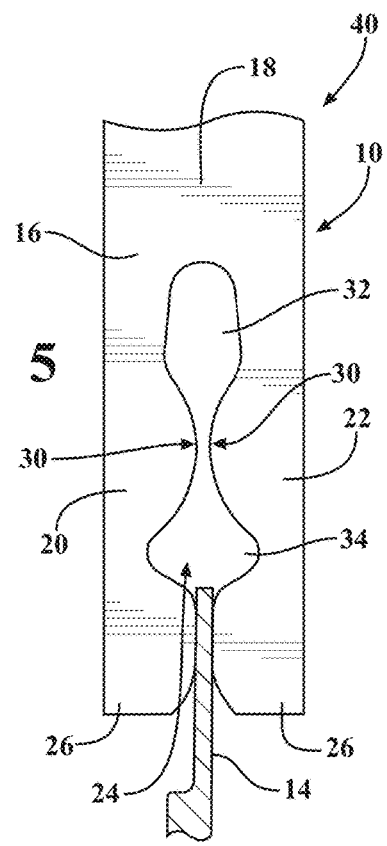
FIG. 5 is a front view of the electrical connector of FIG. 2 coupled to the control valve.

The first leg 20 and the second leg 22 each have an end portion 26 disposed at the terminal end of each leg 20,22. The end portions 26 are configured to engage the electrical termination 14 between the first leg 20 and the second leg 22, as best illustrated in FIG. 5. The end portions 26 each have a length and a width. The distance between the end portion 26 of the first leg 20 and the end portion 26 of the second leg 22 may be constant or variable. Moreover, the distance between the end portion 26 of the first leg 20 and the end portion 26 of the second leg 22 is configured to allow the first leg 20 and the second leg 22 to engage the electrical termination 14 to establish the electrical circuit.

Figure 2:
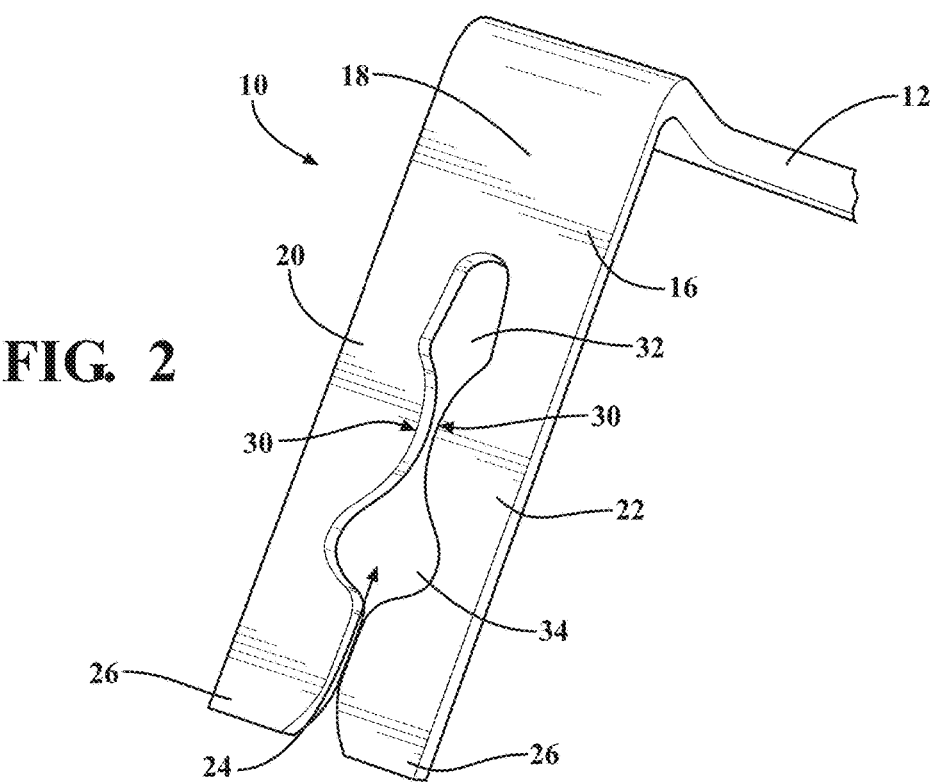
FIG. 2 is a front perspective view of an electrical connector according to the present invention.

As best illustrated in FIG. 2, at least one of the first leg 20 and the second leg 22 include a geometric feature 30. In other words, one or both of the first and second legs 20, 22 include the geometric feature 30. The geometric feature 30 extends into the slot 24 such that the slot 24 is configured to prevent insertion of a second electrical connector 10 into the slot 24. The geometric feature 30 on the first leg 20 may be the same or different shape and size as the geometric feature 30 on the second leg 22.

Moreover, the geometric feature 30 separates the slot 24 into an upper slot portion 32 and a lower slot portion 34. The upper slot portion 32 is proximal the bridge portion 18 and has boundaries of the first leg 20, the second leg 22, the bridge portion 18, and the geometric feature 30. Additionally, the lower slot portion 34 is distal the bridge portion 18 and has boundaries of the geometric feature 30, the first leg 20, and the second leg 22. The upper slot portion 32 has a length and a width which may vary over the length. Similarly, the lower slot portion 34 also has a length and a width which may vary over the length. Referring still to the embodiment illustrated in FIG. 2, the upper slot portion 32 and the lower slot portions 34 may have the same width as one another or may have different widths such that the lower slot portion 34 has a larger width than the upper slot portion 32, as illustrated in FIG. 2. However, it is also contemplated that the upper slot portion 32 may have a larger width than the lower slot portion 34.

In one embodiment, although not required, the geometric feature 30 is disposed approximately halfway between the bridge portion 18 and the end portion 26 of the first leg 20 or the second leg 22 such that the length of the upper slot portion 32 and the length of the lower slot portion 34 are approximately equal. However, it is also contemplated that the geometric feature 30 may be disposed anywhere along the first leg 20 or the second leg 22 such that the length of the upper slot portion 32 may be greater than the length of the lower slot portion 34, or the length of the upper slot portion 32 may be less than the length of the lower slot portion 34.

In the embodiment illustrated in FIG. 2, the geometric feature 30 is rounded such that the slot 24 has a generally hourglass shape. In other embodiment, the geometric feature may be a hump shape or a curved shape. However, it is also contemplated that the geometric feature 30 may be any shape including but not limited to pointed, squared, triangular, polygonal or the like.

The geometric feature 30 is disposed on at least one of the first leg 20 and the second leg 22. In one embodiment, the geometric feature 30 comprises a first geometric feature 30 and a second geometric feature 30 and the first leg 20 includes the first geometric feature 30 and the second leg 22 includes the second geometric feature 30. In the embodiment illustrated in FIG. 2, the first geometric feature 30 and the second geometric feature 30 extend toward each other, are mirror images of one another, and are located at approximately the same location along the length of the first leg 20 and the second leg 22. However, it is also contemplated that the first geometric feature 30 and the second geometric feature 30 may be different sizes and or shapes from one another. Moreover, it is contemplated that the first geometric feature 30 and the second geometric feature 30 may be located at different points along the length of the first leg 20 and of the second leg 22.

Figure 3:
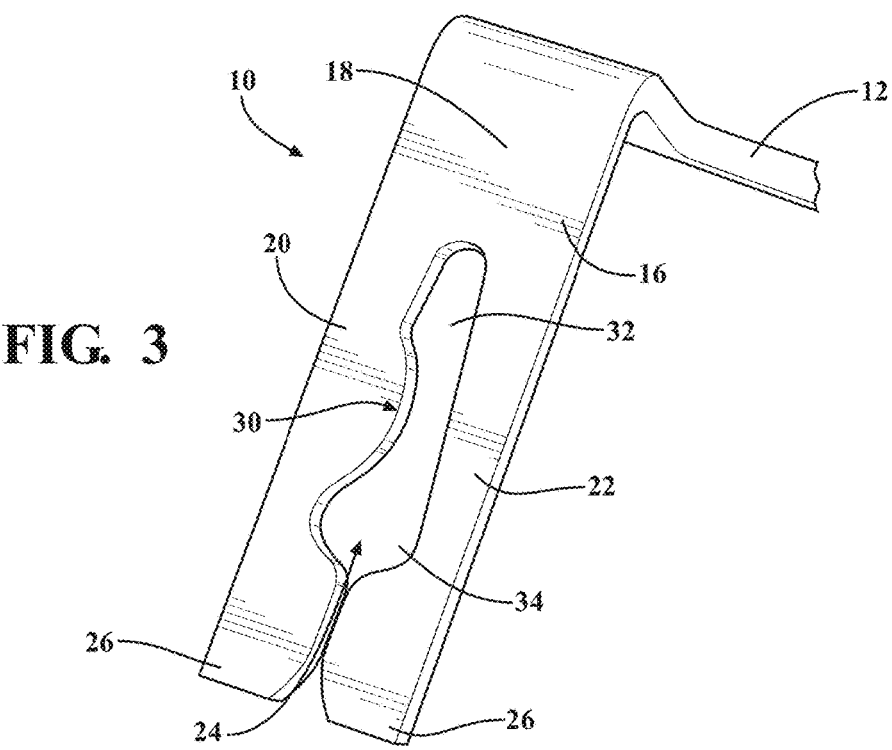
FIG. 3 is a perspective view of an alternate embodiment of an electrical connector.

In another embodiment, illustrated in FIG. 3, the geometric feature 30 is disposed only on the first leg 20. It is also contemplated that the geometric feature 30 may be disposed only on the second leg 22. In the embodiment illustrated in FIG. 3, the geometric feature 30 is rounded. However, it is also contemplated that the geometric feature 30 may be of any shape and/or size, as described above.

In one embodiment, a length of the upper slot portion 32 is less than the width of the end portion 26 of the first leg 20 or the second leg 22. Moreover, in another embodiment, a length of the lower slot portion 34 is less than the width of the end portion 26 of the first leg 20 or the second leg 22. In yet another embodiment, the width of the upper slot portion 32 is less than the width of the end portion 26 of the first leg 20 or the second leg 22. Additionally, in another embodiment, the width of the lower slot portion 34 is less than the width of the end portion 26 of the first leg 20 or the second leg 22.

Having the electrical connector 10 include the geometric feature 30 extending into the slot 24 such that the slot 24 is configured to prevent insertion of a second electrical connector 10 into the slot 24, prevents the end portions 26 of the electrical connector 10 from sliding into the slot 24 of a second electrical connector 10 and becoming entangled. If two electrical connectors 10 become entangled, deformity may occur during the tangling event or during an event in which the tangled electrical connectors 10 are separated. As such, preventing entanglement by preventing the end portions 26 of the electrical connector 10 from sliding into the slot 24 of a second electrical connector 10 will reduce the number of deformed electrical connectors 10, will decease scrap, and will improve assembly efficiency. It is contemplated that the embodiments described herein may be separate and distinct from one another or it is contemplated that one electrical connector 10 may include aspects of more than one embodiment described herein. For example, in the embodiment in which the length of the upper slot 32 is less than the width of the end portion 26 of the first leg 20 or second leg 22 may be present in conjunction with the embodiment in which the length of the lower slot portion 34 is less than the width of the end portions 26 of the first leg 20 or second leg 22. Similarly, it is contemplated that any embodiment described herein may be used alone or with one or more additional embodiments described herein.

One exemplary embodiment of an electrical connector 10 having the geometric feature 30 in the appropriate location and of the appropriate size to withstand the stress and strain of the electrical connector 10 must be able to withstand maximum crimp force and maximum stress during production, shipping, assembly, and operation as illustrated in FIG. 2.

Figure 4:
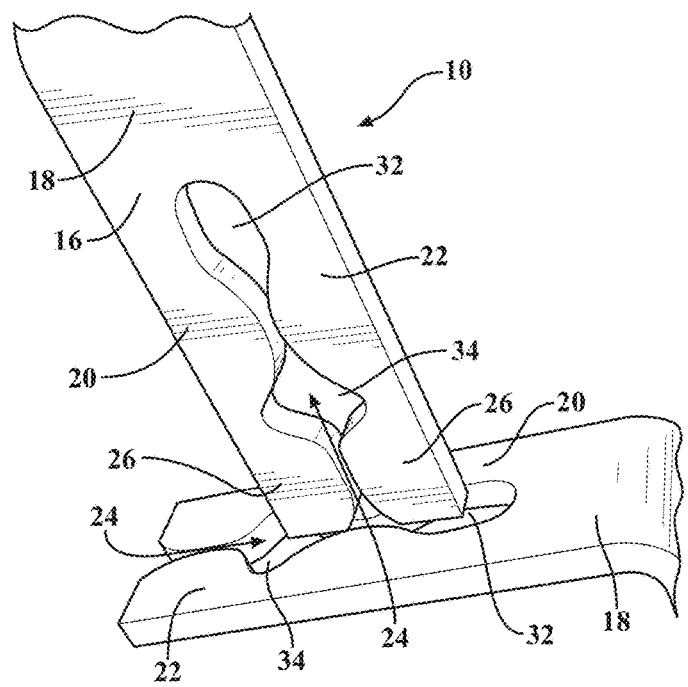
FIG. 4 is a front perspective view of multiple electrical connectors of FIG. 2.

As best illustrated in FIG. 4, the electrical connector 10 has a thickness. The thickness of the electrical connector 10 may be constant throughout, may be variable in a latitudinal or longitudinal direction across the electrical connector 10, or may vary in any other way if desired. In one embodiment, at least a portion of the electrical connector 10 has a thickness which is greater than a distance between the end portion 26 of the first leg 20 and the end portion 26 of the second leg 22. In one embodiment, the distance between the end portion 26 of the first leg 20 and the end portion 26 of the second leg 22 is measured at the shortest distance between the end portion 26 of the first leg 20 and the end portion 26 of the second leg 22, if the distance is not constant. The electrical connector 10 having a thickness greater than the distance between the end portion 26 of the first leg 20 and the end portion 26 of the second leg 22 prevents the electrical connector 10 from sliding between the end portions 26 of the first leg 20 and the second leg 22 of a second electrical connector 10 and becoming entangled. If two electrical connectors 10 become entangled, deformity may occur during the tangling event or during an event in which the tangled electrical connectors 10 are separated. As such, preventing entanglement by the electrical connector 10 having a thickness which is greater than a distance between the end portion 26 of the first leg 20 and the end portion 26 of the second leg 22 will reduce the number of deformed electrical connectors 10 and improve assembly efficiency. It is contemplated that the embodiments described herein may be separate and distinct from one another or it is contemplated that one electrical connector 10 may have more than one aspect of the embodiments described herein. For example, in the embodiment in which the electrical connector 10 has a thickness which is greater than a distance between the end portion 26 of the first leg 20 and the end portion 26 of the second leg 22 may be present in conjunction with the embodiment in which the length of the upper slot portion 32 is less than the width of the end portion 26 of the first leg 20 or of the second leg 22. Similarly, it is contemplated that any embodiment described herein may be used alone or with aspect one or more additional embodiments described herein.

With reference to FIG. 5, the electrical connector 10 may be used in a control valve 40 for controlling a flow of fluid medium. The control valve 40 includes a valve housing including the electrical termination 14 and the electrical connector 10. When the electrical connector 10 is used in the control valve 40, an electrical circuit is established to control the flow of fluid medium. It is to be appreciated that the control valve 40 may be a pressure control valve 40 or a flow control valve 40. Moreover, the control valve 40 may include one or more of any type of valve for the regulation of a fluid medium including a check valve, a poppet valve, a ball valve, a spool valve, or the like. Furthermore the control valve 40 may be actuated by any linear force including a solenoid, power screw, hydraulic actuator, pneumatic actuator or the like.

Having the slot 24 of the first electrical connector 10 configured to prevent insertion of the second electrical connector 10 into the slot prevents the entanglement as illustrated in at least FIG. 1. Specifically, during shipping, many prior art electrical connectors 7 are shipped in a single container. However, during the shipping process of prior art electrical connectors 7, the prior art electrical connectors 7 slide around and a leg of the second prior art electrical connector 7 is unintentionally inserted into the slot 9 and becomes entangled, as illustrated in FIG. 1B. Untangling the prior art electrical connectors 7 requires additional assembly time and often leads to damage of one or more of the prior art electrical connectors 7. Therefore, having the slot 24 of the electrical connector 10 configured to prevent insertion of the second electrical connector 10 into the slot 24 increases efficiency during assembly as untangling is no longer necessary. Additionally, having the slot 24 of the electrical connector 10 configured to prevent insertion of the second electrical connector 10 into the slot 24 prevents deformation of the electrical connector 10 due to untangling. It is contemplated that the first electrical connector 10 and the second electrical connector 10 may be the same electrical connectors, or may be different electrical connectors (i.e. different in size and/or shape than one another).

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:
1. An electrical connector comprising:
   a blade terminal configured to establish an electrical circuit; and
   a receiving terminal coupled to said blade terminal, said receiving terminal comprising:
      a bridge portion;
      a first leg extending from said bridge portion; and
      a second leg extending from said bridge portion and separated from said first leg by a slot defined by said bridge portion, said first leg, and said second leg;
   wherein at least one of said first leg and said second leg include a geometric feature extending into said slot such that said slot is configured to prevent insertion of a second electrical connector into said slot,
   wherein said first leg and said second leg each include end portions having a width,
   wherein said geometric feature separates said slot into an upper slot portion proximal said bridge portion and a lower slot portion distal said bridge portion relative to said upper slot portion, and
   wherein said lower slot portion is in between said geometric feature and said end portion and narrows in width and length as the lower slot portion approaches said end portion of either of said first leg or said second leg.
2. The electrical connector of claim 1, wherein a length of said upper slot portion is less than said width of said end portion of said first leg or said second leg.
3. The electrical connector of claim 2, wherein a length of said lower slot portion is less than said width of said end portion of said first leg or said second leg.
4. The electrical connector of claim 1, wherein said first leg and said second leg each include end portions having a width and wherein a width of said upper slot portion is less than said width of said end portion of said first leg or said second leg.
5. The electrical connector of claim 4, wherein a width of said lower slot portion is less than said width of said end portion of said first leg or said second leg.
6. The electrical connector of claim 2, wherein said first leg and said second leg each include end portions having a width and wherein a width of said upper slot portion is less than said width of said end portion of said first leg or said second leg.
7. The electrical connector of claim 6, wherein a width of said lower slot portion is less than said width of said end portion of said first leg or said second leg.

8. The electrical connector of claim 1, wherein said geometric feature comprises a first geometric feature and a second geometric feature and said first leg includes said first geometric feature and said second leg includes said second geometric feature extending toward each other.

9. The electrical connector of claim 2, wherein said geometric feature is disposed approximately half way between said bridge portion and said end portion on said first leg.

10. A control valve for controlling a flow of fluid medium, said control valve comprising:
 a valve housing including an electrical termination; and
 an electrical connector comprising:
  a blade terminal configured to establish an electrical circuit when said blade terminal is engaged with said electrical termination; and
  a receiving terminal coupled to said blade terminal, said receiving terminal comprising:
   a bridge portion;
   a first leg extending from said bridge portion; and
   a second leg extending from said bridge portion and separated from said first leg by a slot defined by said bridge portion, said first leg, and said second leg;
 wherein at least one of said first leg and said second leg include a geometric feature extending into said slot such that said slot is configured to prevent insertion of a second electrical connector into said slot,
 wherein said first leg and said second leg each include end portions having a width,
 wherein said geometric feature separates said slot into an upper slot portion proximal said bridge portion and a lower slot portion distal said bridge portion relative to said upper slot portion, and
 wherein said lower slot portion is in between said geometric feature and said end portion and narrows in width and length as the lower slot portion approaches said end portion of either of said first leg or said second leg.

11. The control valve of claim 10, wherein a length of said upper slot portion is less than said width of said end portion of said first leg or said second leg.

12. The control valve of claim 11, wherein a length of said lower slot portion is less than said width of said end portion of said first leg or said second leg.

13. The control valve of claim 12, wherein said first leg and said second leg each include end portions having a width and wherein a width of said upper slot portion is less than said width of said end portion of said first leg or said second leg.

14. The control valve of claim 13, wherein a width of said lower slot portion is less than said width of said end portion of said first leg or said second leg.

15. An electrical connector comprising:
 a blade terminal configured to establish an electrical circuit; and
 a receiving terminal defining a slot configured to prevent insertion of a second electrical connector into said slot and having a first leg and a second leg,
 wherein said receiving terminal includes at least one geometric feature extending into said slot such that said slot is configured to prevent insertion of a second electrical connector into said slot,
 wherein said first leg and said second leg each include end portions having a width,
 wherein said geometric feature separates said slot into an upper slot portion proximal said bridge portion and a lower slot portion distal said bridge portion relative to said upper slot portion, and
 wherein said lower slot portion is in between said geometric feature and said end portion and narrows in width and length as the lower slot portion approaches said end portion of either of said first leg or said second leg.

16. The electrical connector of claim 15, wherein said first leg and said second leg both include said geometric feature extending toward each other.

* * * * *